United States Patent
Doty et al.

(10) Patent No.: US 6,917,041 B2
(45) Date of Patent: Jul. 12, 2005

(54) EVENT-DRIVEN CHARGE-COUPLED DEVICE DESIGN AND APPLICATIONS THEREFOR

(75) Inventors: John P. Doty, Bedford, MA (US); George R. Ricker, Jr., Cambridge, MA (US); Barry E. Burke, Lexington, MA (US); Gregory Y. Prigozhin, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 94 days.

(21) Appl. No.: 10/391,061

(22) Filed: Mar. 18, 2003

(65) Prior Publication Data

US 2004/0026623 A1 Feb. 12, 2004

Related U.S. Application Data

(60) Provisional application No. 60/365,382, filed on Mar. 18, 2002.

(51) Int. Cl.$^7$ .................................................. G01T 1/24
(52) U.S. Cl. .............................. 250/370.09; 250/370.08
(58) Field of Search ...................... 250/370.09, 370.08, 250/208.1, 214 LA; 365/183; 257/239

(56) References Cited

U.S. PATENT DOCUMENTS

| | | | |
|---|---|---|---|
| 4,644,405 A | | 2/1987 | Roy et al. |
| 4,723,762 A | * | 2/1988 | Murata et al. ................. 266/58 |
| 4,956,686 A | * | 9/1990 | Borrello et al. ............. 257/440 |
| 5,250,824 A | * | 10/1993 | Janesick ...................... 257/216 |
| 5,331,165 A | * | 7/1994 | Frame .................... 250/370.09 |
| 5,693,968 A | * | 12/1997 | Cherry et al. ................ 257/231 |
| 6,252,627 B1 | | 6/2001 | Frame et al. |
| 6,444,968 B1 | * | 9/2002 | Burt et al. ................ 250/208.1 |
| 6,784,926 B1 | * | 8/2004 | Korpi et al. ............ 348/207.99 |
| 2002/0063790 A1 | * | 5/2002 | Takahashi ................... 348/311 |

* cited by examiner

Primary Examiner—David Porta
Assistant Examiner—Faye Polyzos
(74) Attorney, Agent, or Firm—Gauthier & Connors LLP

(57) ABSTRACT

An event-driven X-ray CCD imager device uses a floating-gate amplifier or other non-destructive readout device to non-destructively sense a charge level in a charge packet associated with a pixel. The output of the floating-gate amplifier is used to identify each pixel that has a charge level above a predetermined threshold. If the charge level is above a predetermined threshold the charge in the triggering charge packet and in the charge packets from neighboring pixels need to be measured accurately. A charge delay register is included in the event-driven X-ray CCD imager device to enable recovery of the charge packets from neighboring pixels for accurate measurement. When a charge packet reaches the end of the charge delay register, control logic either dumps the charge packet, or steers the charge packet to a charge FIFO to preserve it if the charge packet is determined to be a packet that needs accurate measurement. A floating-diffusion amplifier or other low-noise output stage device, which converts charge level to a voltage level with high precision, provides final measurement of the charge packets. The voltage level is eventually digitized by a high linearity ADC.

30 Claims, 5 Drawing Sheets

EVENT-DRIVEN CHARGE-COUPLED DEVICE DESIGN AND APPLICATIONS THEREFOR

CROSS-REFERENCE TO RELATED PROVISIONAL APPLICATION

The present patent application claims priority under 35 U.S.C. §119 from U.S. Provisional Patent Application Ser. No. 60/365,382 filed on Mar. 18, 2002. The entire contents of U.S. Provisional Patent Application Ser. No. 60/365,382 filed on Mar. 18, 2002 are hereby incorporated by reference.

GOVERNMENT RIGHTS NOTICE

The present invention was made with government support under Grant (Contract) Number, NASW-4690, awarded by NASA. The Government has certain rights to this invention.

FIELD OF THE PRESENT INVENTION

The present invention is directed to X-ray and optical CCDs that operate at high speeds and low power with near unity quantum efficiency and exhibit low readout noise. More particularly, the present invention is directed to X-ray CCDs that have been optimized for measurements of X-ray polarization, for application as focal planes for short focal length, high resolution X-ray telescopes, and for extremely large format coded-aperture CCD cameras. Moreover, the present invention is directed to optical CCDs utilized in space surveillance from space satellites that require that a sensor for examining a wide field filled with sparse star and satellite images and utilized as lightning detectors.

BACKGROUND OF THE PRESENT INVENTION

X-ray CCDs have become the mainstream technology for space-based X-ray imaging spectroscopy as a result of the exceptionally high quality of the devices currently in production. As the need for more information from space-based X-ray imaging spectroscopy increases, there has been a trend for ever-larger CCD arrays. This has led to the development of very large CCD arrays like the MIT Lincoln Laboratory CCID-20 (2048×4098 pixels). However, the continuation of this trend towards even larger CCD arrays is threatened by a number of technological factors.

The most important factor is the rapid increase in power consumption on a system level as the number of pixels and size of the sensor arrays grow larger. This power consumption consists of two main components: 1) power required for driving large parallel gate capacitances and 2) the power consumed in signal processing circuits.

In addition, large modem CCD arrays used in space-based X-ray imaging spectroscopy are more vulnerable to radiation damage because charge has to be transferred over very large distances (>5 cm) in silicon. Also, the large CCD array sizes lead to slower frame times, and therefore, degrade the time resolution of the integrated instrument.

One conventional device developed to address the various technological factors discussed above is the CMOS Active Pixel Sensor. Although CMOS Active Pixel Sensor characteristic features are: 1) extremely low power consumption; 2) random access; 3) extensive on chip signal processing; and 4) intrapixel signal processing; CMOS Active Pixel Sensors are not readily applicable to X-ray detection.

First, CMOS Active Pixel Sensors are implemented using CMOS technology where transistors are made in relatively heavily doped wells. This results in an extremely shallow depletion depth on the order of 0.2–0.5 $\mu$m, thereby rendering the CMOS Active Pixel Sensors useless for X-ray spectroscopy. The shallow depletion depth could be addressed by increasing the substrate resistivity that in turn would dramatically increase the CMOS Active Pixel Sensors' sensitivity to single-event upsets and latch-ups. However, this increase in sensitivity would present other problems when utilizing CMOS Active Pixel Sensors in the radiation environment of a space borne instrument.

Second, the fill factor of existing CMOS Active Pixel Sensor designs is unacceptably low. This is especially true for the ever more popular CMOS Active Pixel Sensor designs with complicated pixel structure which are being used in order to improve some particular characteristics of a sensor, such as readout or flat pattern noise.

Third, the typical readout noise of CMOS Active Pixel Sensors is currently at least an order of magnitude higher than that of CCDs. High readout noise makes the current CMOS Active Pixel Sensor technology unacceptable for X-ray detection. Although a CMOS Active Pixel Sensor has been developed with a readout noise of 4.5 electrons, this CMOS Active Pixel Sensor works in the so called "soft reset" mode which implies a very slow recovery of the output node voltage to the reset level. This very slow recovery of the output node voltage to the reset level is unacceptable for the continuous readout mode required for X-ray sensor operation.

Fourth, every pixel of CMOS Active Pixel Sensor has its own amplifier with a different gain and offset. Individually calibrating millions of pixels is extremely difficult, both experimentally and computationally, and secular variations in these calibrations will remain as unknown systematic errors in the data. CCDs have many fewer amplifiers, so accurate calibration is possible.

In X-ray astronomy, raw calibration data is used to determine unknown parameters of a detector model. To do so, the penetration of X-rays into the device and the collection of the resulting photoelectric charge must be modeled. Constructing an adequate model is not easy for a CCD, but it is far more difficult for a CMOS Active Pixel Sensor because the CMOS Active Pixel Sensor pixel structure is far more complex.

Moreover, conventional X-ray CCD sensors suffer from: 1) low pixel rates, which cause pileup in high throughout imaging spectrometers; 2) high detector cost, which negatively impacts the affordability of large focal planes; 3) near cryogenic temperature operation, which negatively impacts thermal system cost and the risks in ground testing; 4) high power consumption, which negatively impacts the cost of the satellite and the viewing angle constraints; and 5) dimensionally large pixels, which require relatively long focal length optics and negatively impact polarization sensitivity.

Therefore, it is desirable to design an X-ray CCD array device that can operate at high speeds and at low power (less than that of conventional devices). It is also desirable to design an X-ray CCD array device that can operate with near unity quantum efficiency and exhibit low readout noise. Moreover, it is desirable to achieve these operational parameters at near room temperature (~10° C.), rather than requiring cryogenic temperatures (T~−90° C. or less).

Furthermore, it is desirable to design an X-ray CCD array device that is optimized for measurements of X-ray polarization, for application as focal planes for short focal length optics, high-resolution X-ray telescopes, and for extremely large format coded-aperture CCD cameras.

SUMMARY OF THE PRESENT INVENTION

A first aspect of the present invention is an imaging apparatus. The imaging apparatus includes a CCD imager having a plurality of pixels, each pixel producing a charge packet having a charge level in proportional to a level of radiation incident thereupon; a charge detection circuit, operatively connected to the CCD imager, to detect when a charge packet associated with a pixel has a charge level that exceeds a predetermined threshold; and a conversion circuit to convert charge packets into voltage levels, the converted charge packets being associated with a subarray of pixels centered upon a pixel having a charge packet with a charge level that the charge detection circuit has detected as exceeding the predetermined threshold.

A second aspect of the present invention is a method of imaging. The method produces a charge packet having a charge level in proportional to a level of radiation incident upon a pixel of a CCD imager having a plurality of pixels; detects when a charge level of a charge packet associated with a pixel exceeds a predetermined threshold; and converts charge packets into voltage levels, the converted charge packets being associated with a subarray of pixels centered upon a pixel having a charge packet with a charge level that has been detected as exceeding the predetermined threshold.

A third aspect of the present invention is a method of finding of a centroid of several neighboring pixels that contain satellite image data using event driven imaging. The method produces a set of pixels of satellite image data, each pixel having a charge packet, the charge packet having a charge level in proportional to a level of radiation incident upon a pixel of a CCD imager; detects when the charge level of a charge packet associated with a pixel exceeds a predetermined threshold; forms subarrays of pixels, each subarray of pixels being centered upon the pixel having a charge packet with a charge level exceeding the predetermined threshold; eliminates, from the produced set of pixels, pixels not associated with a formed subarray; and determines a centroid for each subarray of pixels.

BRIEF DESCRIPTION OF THE DRAWINGS

The present invention may take form in various components and arrangements of components, and in various steps and arrangements of steps. The drawings are only for purposes of illustrating a preferred embodiment or embodiments and are not to be construed as limiting the present invention, wherein.

DETAILED DESCRIPTION OF THE PRESENT INVENTION

Figure 1:
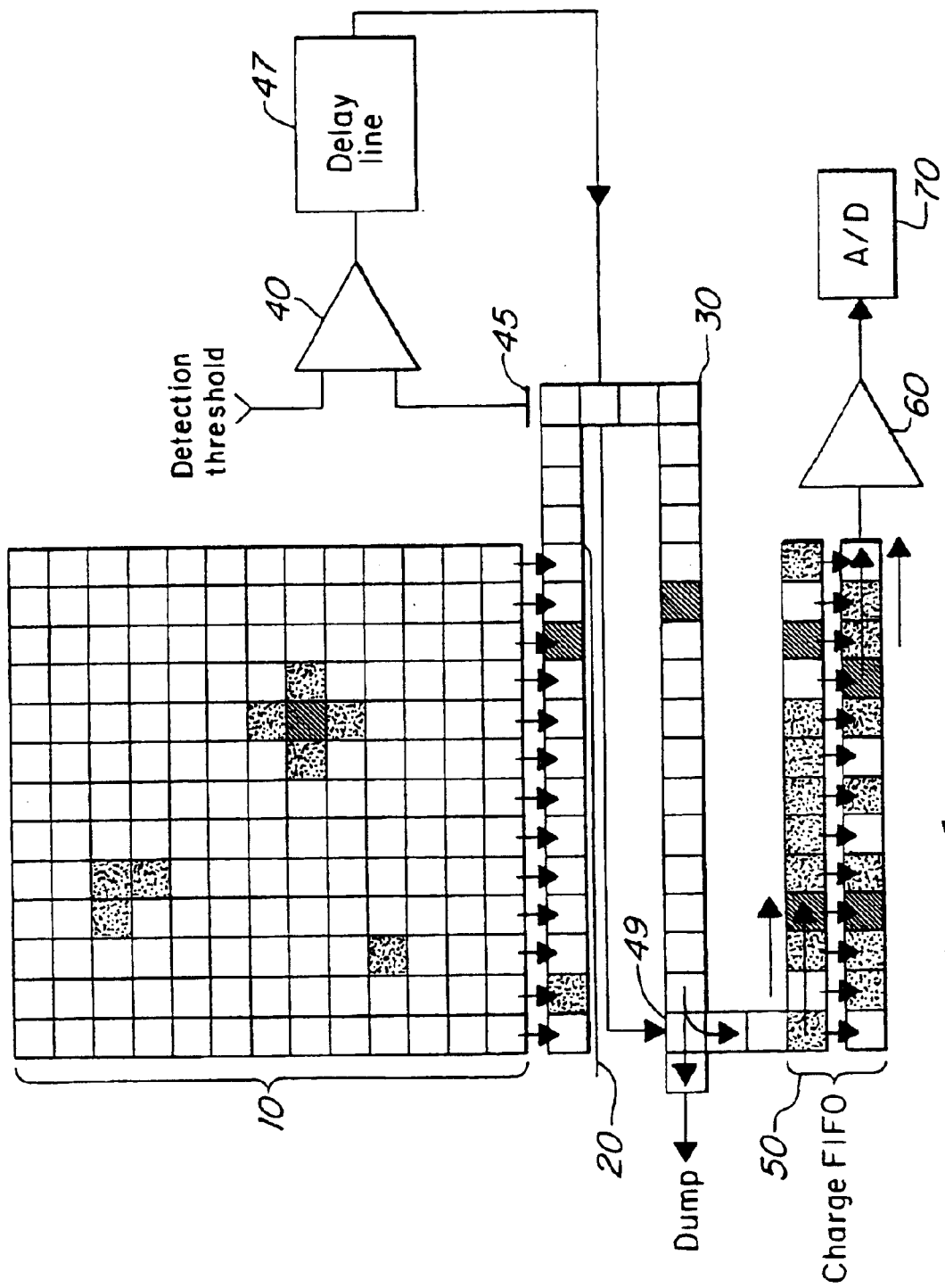
FIG. 1 is a schematic illustration of a charge readout used in an event-driven CCD according to the concepts of the present invention.

The present invention will be described in connection with specific embodiments; however, it will be understood that there is no intent to limit the present invention to the embodiments described herein. On the contrary, the intent is to cover all alternatives, modifications, and equivalents as may be included within the spirit and scope of the present invention as defined by the appended claims.

For a general understanding of the present invention, reference is made to the drawings. In the drawings, like reference have been used throughout to designate identical or equivalent elements. It is also noted that the various drawings illustrating the present invention are not drawn to scale and that certain regions have been purposely drawn disproportionately so that the features and concepts of the present invention could be properly illustrated.

As noted above, in conventional CCD detectors for satellite-borne cameras, the CCD readout is usually controlled by one set of electronics, while the actual detection of photons relies on software in dedicated microprocessors. This approach is rather wasteful of power, as the charge from every CCD pixel is digitized to high precision, although typically less than 0.1% of all pixels being processed by the digitizer contain useful information. The excessive use of power, in turn, limits the speed at which the pixels can be read out, as the dissipation of heat within the analog electronics becomes problematic.

To address these problems, the present invention utilizes silicon X-ray sensors for use in high-energy astrophysics. According to the concepts of the present invention, the silicon X-ray sensor is an event driven X-ray CCD that is able to operate at high speeds, at low power, with near unity quantum efficiency, and exhibiting low readout noise (~1 to 3 e⁻ RMS). The event driven X-ray CCD of the present invention also is capable of achieving these performance levels at near room temperature (~10° C.), rather than requiring cryogenic temperatures (T~−90° C. or less). Furthermore, the event driven X-ray CCD of the present invention utilizes a micron pixel X-ray CCD with 2 $\mu$m×2 $\mu$m pixels, containing ~$10^8$–$10^9$ pixels per device and optimized for measurements of X-ray polarization, for application as focal planes for short focal length, high resolution X-ray telescopes, and for extremely large format coded-aperture CCD cameras.

FIG. 1 illustrates one embodiment of an event driven X-ray CCD according to the concepts of the present invention. As illustrated in FIG. 1, a frame storage buffer 10 receives image data in the form of charge packets from an imager (not shown).

In a preferred embodiment of the present invention, the imager is partitioned into a predetermined number of imaging array areas. Each imaging array area has a corresponding frame storage buffer 10 to which each imaging array area executes a parallel transfer of its image data. In this preferred embodiment, a 512×512 pixel imager is partitioned into four segments. The array dimensions enable the present invention to utilize existing 44-pin packages, so as to reduce costs. However, it is noted that a 1024×1024 array size could have been chosen.

As noted above, photoelectrons or charge packets from the imaging array area are stored in the frame storage buffer 10 and then transferred row by row to a serial register 20 for serial readout.

The readout process of the event driven X-ray CCD of the present invention uses two charge-sensing amplifiers. The first is a non-destructive readout device, preferably a floating-gate amplifier, which measures the charge of a pixel capacitively, and therefore non-destructively. The second is a low-noise output stage device, preferably a floating-diffusion amplifier, similar to those used with conventional X-ray CCDs.

According to the concepts of the present invention, the charge of each pixel is measured by the floating-gate amplifier and compared to a programmable detection threshold: only those pixels exceeding the detection threshold (and their immediate neighbors) are later measured by the floating-diffusion amplifier. Since the first measurement does not need to be of high precision and is done capacitively, the first measurement takes very little power. Furthermore, since the second measurement, although a high precision measurement, is made upon only a small fraction of the CCD pixels, the second measurement takes very little power.

With respect to FIG. 1, the first charge readout uses a floating-gate charge-sensing amplifier 45. The floating-gate charge-sensing amplifier 45 senses the charge associated with a pixel capacitively. In this way, the charge is not actually transferred to the floating-gate charge-sensing amplifier 45. Thus, the present invention can noiselessly recover the charge packet for further processing.

The output of the floating-gate charge-sensing amplifier 45 drives a clamp/sample correlated double sampling circuit 40 whose sampler is simply a level discriminator. The clamp/sample correlated double sampling circuit 40 identifies each pixel that has an associated charge level above a predetermined or programmable detection threshold. Each charge packet, regardless of its level, is stored in and clocked through an extra-long serial register, charge delay register 30, that acts a register extension to the serial register 20. This charge delay register 30 is at least twice as long as the serial register 20, so that when the clamp/sample correlated double sampling circuit 40 triggers on a charge packet, the immediate neighbors of that charge packet are still in the charge delay register 30 and can be measured.

In this way, the present invention is able to reassemble charge from a single X-ray event, which was split across multiple pixels, into a charged particle event subarray of pixels. The reassembled charge from a single X-ray event enables the present invention to recognize and reject charged particle events by their shape, which will be discussed in more detail below with respect to FIG. 3.

In the preferred embodiment discussed above and assuming a 3×3 charged particle event subarray of pixels, the charge delay register 30 must be at least 257 elements (a few extra elements should be included to accommodate for any pipeline delays in the digital chip). In some instances, it may be desirable to accommodate a larger charged particle event subarray size. For example, the use of a 5×5 charged particle event subarray would require the adding of another row's worth of pixels to the charge delay register 30. At a fixed pixel rate, the use of a 5×5 charged particle event subarrays would reduce the event rate capacity by 25/9 relative to a 3×3 charged particle event subarrays.

When a charge packet reaches the end of the charge delay register 30, control logic 49 causes either the charge packet to be dumped (if the charge packet is not associated with a clamp/sample correlated double sampling circuit 40 "trigger") or to be steered to a charge FIFO buffer 50 to preserve it.

The charge FIFO buffer 50 is a serial CCD structure that accepts input packets asynchronously and delivers output packets synchronously. The charge FIFO buffer 50 functions analogously to a digital FIFO memory, allowing the present invention to transform a fast, "bursty", low duty cycle sequence of charge packets into a slow, regular, high duty cycle sequence.

Since the output of the charge FIFO buffer 50 is synchronous, the pixels are read out even if there are no X-ray events present. These "empty" pixels provide a valuable measurement of the output bias of a floating-diffusion charge-sensing amplifier 60.

At the end of the charge FIFO buffer 50, the floating-diffusion charge-sensing amplifier 60 carries out the final measurement of the charge packet. In the preferred embodiment of the present invention, this measurement is carried out on the CCD chip. The floating-diffusion charge-sensing amplifier 60 produces a voltage level with high precision based on the measured charge level of the charge packet. Thereafter, the charge packet is dumped at point.

A digitizing circuit 70, which utilizes a clamp, deintegrate, integrate correlated double sampler and a high linearity ADC, completes the measurement. In the preferred embodiment of the present invention, this measurement is carried out off the CCD chip.

It is noted that the technology for fabricating the charge FIFO buffer 50 is identical to that required for a conventional MOS CCD serial register. The charge FIFO buffer 50 consists of two standard serial registers, connected by a simple charge transfer gate, with which the contents of the one serial register can be moved into the other.

Figure 2:
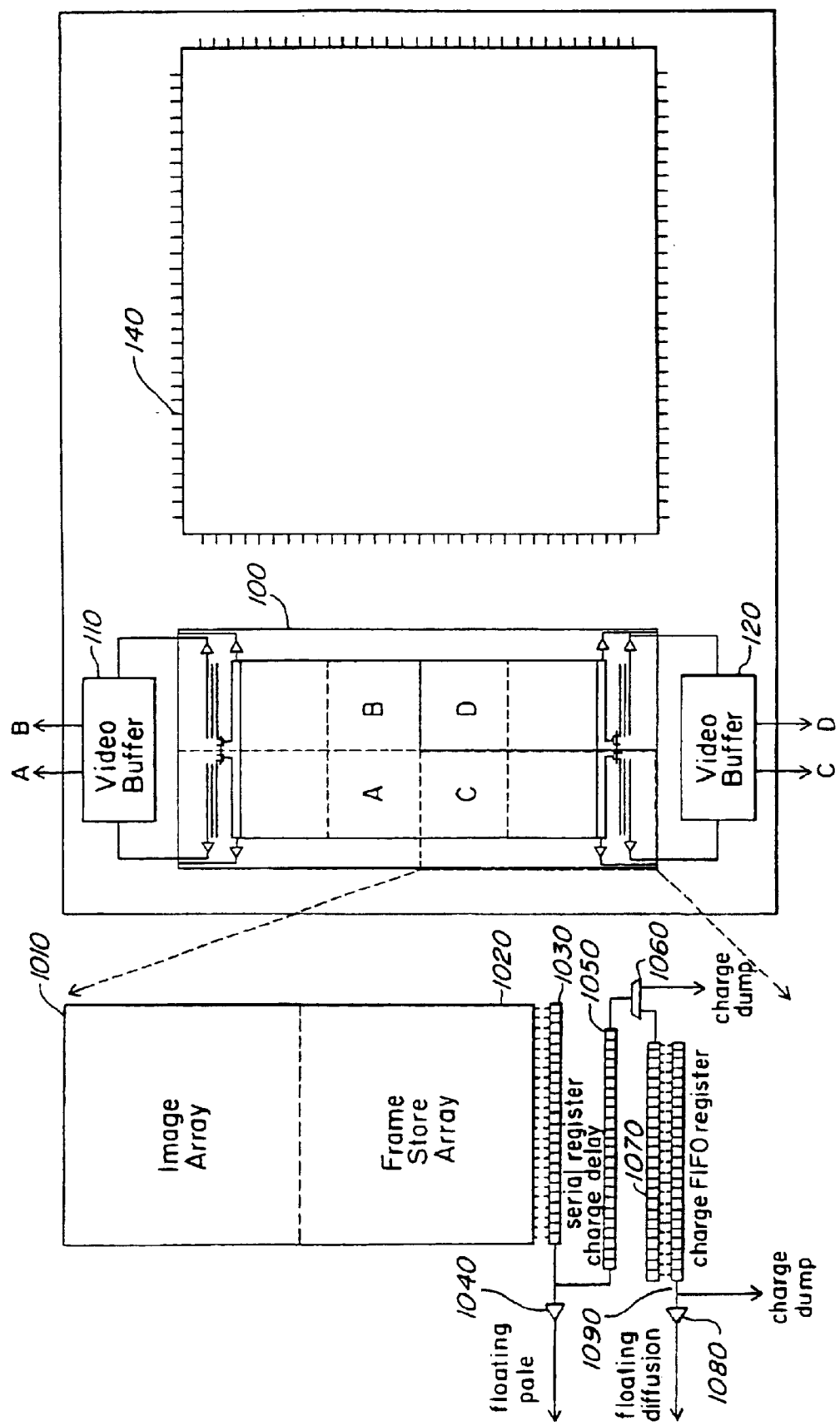
FIG. 2 is a schematic illustration of an event-driven CCD monolithic device organized in four sections according to the concepts of the present invention.

FIG. 2 illustrates another embodiment of an event driven X-ray CCD according to the concepts of the present invention. As illustrated in FIG. 2, a CCD imager array 100 is partitioned into quadrants A, B, C, and D. Each quadrant has an image array area 1010 and a frame storage buffer 1020 that receives image data in the form of charge packets from the image array area 1010.

In a preferred embodiment of the present invention, the CCD imager array 100 is a 512×512 pixel CCD imager that is partitioned into four segments. In this preferred embodiment, the array dimensions enable the present invention to utilize existing 44-pin packages, so as to reduce costs. Moreover, in the preferred embodiment, the array dimensions of the image array area 1010 and the frame storage buffer 1020 are 256×256 pixels.

As noted above, photoelectrons or charge packets from the image array area 1010 are stored in the frame storage buffer 1020 and then transferred row by row to a serial register 1030 for serial readout.

The first charge readout uses a floating-gate charge-sensing amplifier 1040. The floating-gate charge-sensing amplifier 1040 senses the charge associated with a pixel capacitively. In this way, the charge is not actually transferred to the floating-gate charge-sensing amplifier 1040. Thus, the present invention can noiselessly recover the charge packet for further processing.

The output of the floating-gate charge-sensing amplifier 1040 drives a clamp/sample correlated double sampling circuit whose sampler is simply a level discriminator. The level discriminator identifies each pixel that has an associated charge level above a predetermined or programmable detection threshold. Each charge packet, regardless of its level, is stored in and clocked through a charge delay register 1050 that acts a register extension to the serial register 1030. This charge delay register 1050 is at least twice as long as the serial register 1030, so that when the clamp/sample correlated double sampling circuit triggers on a charge packet, the immediate neighbors of that charge packet are still in the charge delay register 1050 and can be measured.

In the preferred embodiment discussed above and assuming a 3×3 charged particle event subarray of pixels, the charge delay register 1050 must be at least 257 elements (a few extra elements should be included to accommodate for any pipeline delays in the digital chip). In some instances, it may be desirable to accommodate a larger charged particle event subarray size. For example, the use of a 5×5 charged particle event subarray would require the adding of another row's worth of pixels to the charge delay register 1050. At a fixed pixel rate, the use of a 5×5 charged particle event subarrays would reduce the event rate capacity by 25/9 relative to a 3×3 charged particle event subarrays.

When a charge packet reaches the end of the charge delay register 1050, control logic 1060 causes either the charge packet to be dumped (if the charge packet is not associated with a clamp/sample correlated double sampling circuit "trigger") or to be steered to a charge FIFO buffer 1070 to preserve it.

The charge FIFO buffer 1070 is a serial CCD structure that asynchronously accepts input packets and delivers output packets synchronously. The charge FIFO buffer 1070 functions analogously to a digital FIFO memory, allowing the present invention to transform a fast, "bursty", low duty cycle sequence of charge packets into a slow, regular, high duty cycle sequence.

Since the output of the charge FIFO buffer 1070 is synchronous, the pixels are read out even if there are no X-ray events present. These "empty" pixels provide a valuable measurement of the output bias of a floating-diffusion charge-sensing amplifier 1080.

At the end of the charge FIFO buffer 1070, the floating-diffusion charge-sensing amplifier 1080 carries out the final measurement of the charge packet before the charge is dumped at point 1090. In the preferred embodiment of the present invention, this measurement is carried out on the CCD chip.

The floating-diffusion charge-sensing amplifier 1080 produces a voltage level with high precision based on the measured charge level of the charge packet. Thereafter, the charge packet is dumped at point 1090. The voltage level is then stored in one of two video buffers 110, 120 before the voltage signal is sent on for further processing and digitization.

This embodiment further includes a field-programmable gate array 140, which orchestrates the CCD clock signals and event discrimination logic.

Figure 3:
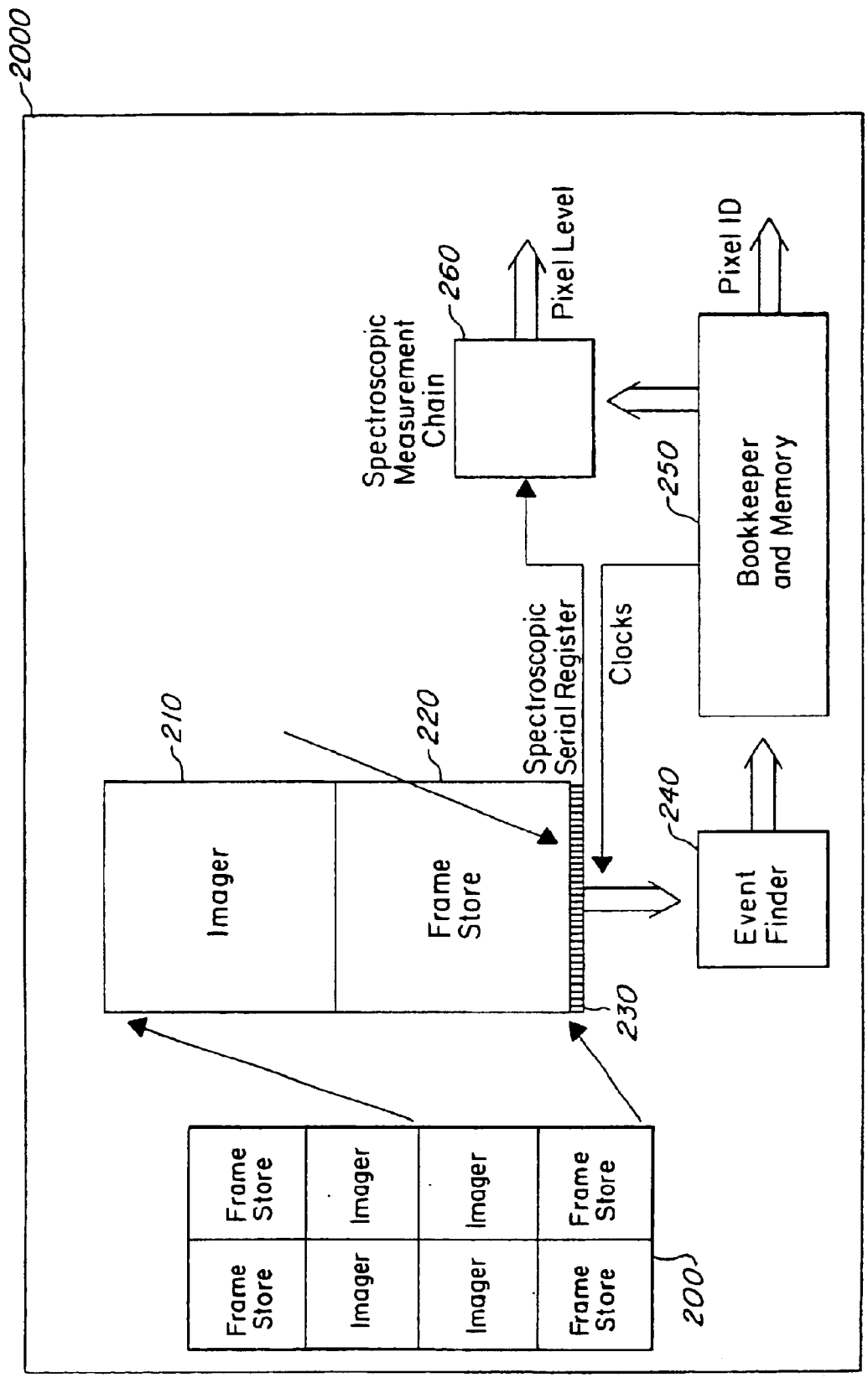
FIG. 3 is a schematic overview of another embodiment of an event-driven CCD according to the concepts of the present invention.

FIG. 3 shows an imager chip 2000 having a 16 k by 16 k (256 Megapixel) CCD imager 200 designed for a readout rate of 1 Gpixel/sec and a pixel rate of 512 kpixel/sec. The 16 k by 16 k CCD imager 200 is divided into four quadrants. Each quadrant has an 8192×8192 pixel CCD imager 210 and an 8192×8192 pixel frame storage buffer 220. Moreover, each quadrant has 32 event storage registers 230. Each event storage register 230 has its own floating-gate event detection amplifier and is capable of storing 1024 pixels. The floating-gate event detection amplifiers are connected to an event finder chip 240. A bookkeeping chip 250 and a spectroscopic measurement chip 260. Each will be discussed below in more detail with respect to FIG. 4.

The imager chip 2000 also has several thousand CMOS gates and flip-flops to control and sequence its 700 independent clock signals.

Figure 4:
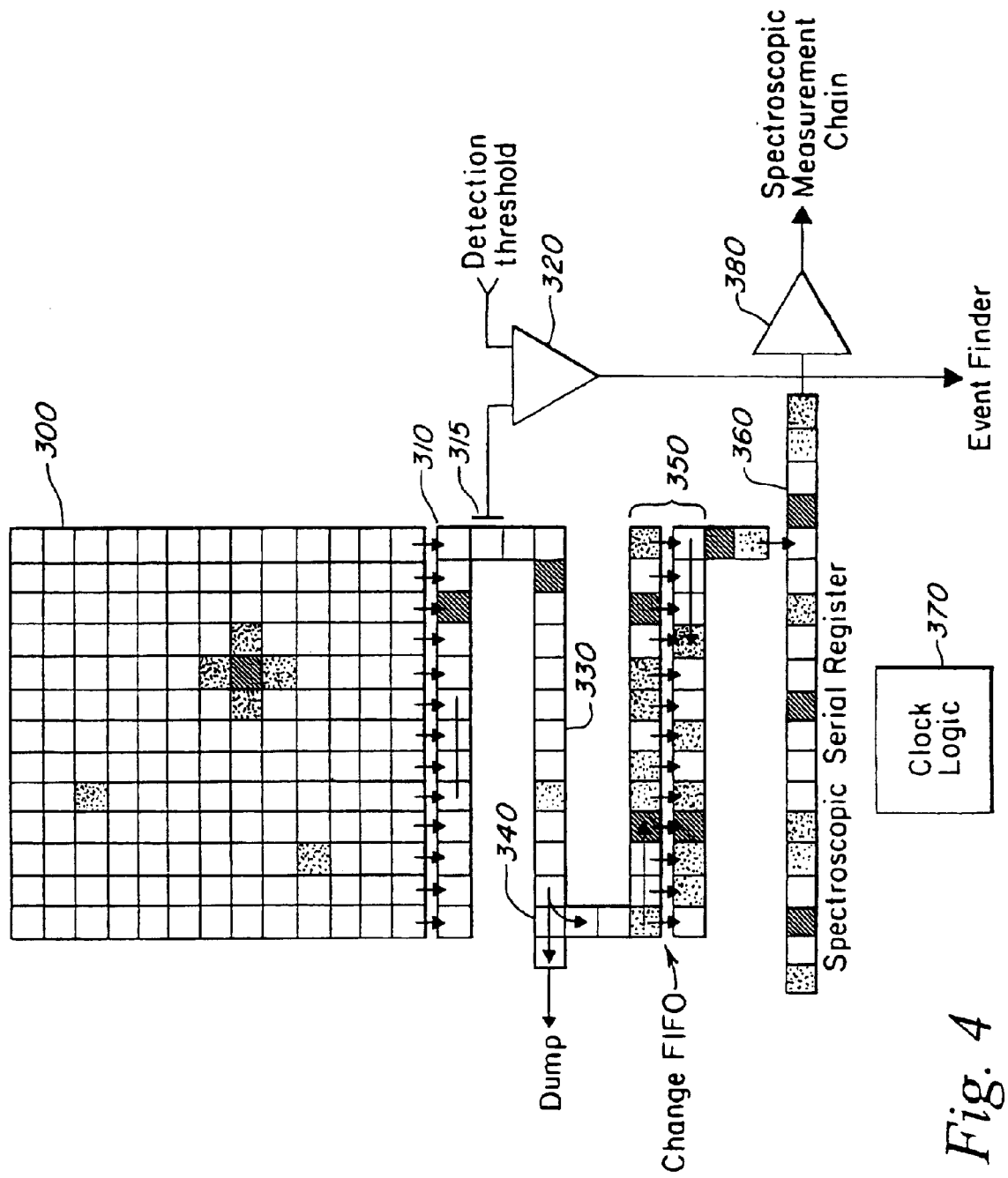
FIG. 4 is a schematic illustration of the charge readout used in the event-driven CCD of FIG. 3 according to the concepts of the present invention.

FIG. 4 shows in more detail the support electronics for each quadrant. Each quadrant has its own support system consisting of 32 event storage registers 300, 32 serial register 310 for serial readout, and 32 floating-gate event detection amplifiers 315 that are connected 32 high-speed measurement chains, each with a threshold comparator 320, for detecting events in the floating-gate amplifier video. The 32 high-speed measurement chains are located within the event finder chip 240 of FIG. 3.

The first charge readout uses the floating-gate event detection amplifiers 315. The floating-gate event detection amplifiers 315 senses the charge associated with a pixel capacitively. In this way, the charge is not actually transferred to the floating-gate event detection amplifiers 315. Thus, the present invention can noiselessly recover the charge packet for further processing.

Each charge packet, regardless of its level, is stored in and clocked through a charge delay register 330 that acts a register extension to the serial register 310. This charge delay register 330 is at least twice as long as the serial register 310, so that when the event finder chip triggers on a charge packet, the immediate neighbors of that charge packet are still in the charge delay register 330 and can be measured.

When a charge packet reaches the end of the charge delay register 330, control logic 340 causes either the charge packet to be dumped (if the charge packet is not associated with a trigger) or to be steered to a charge FIFO buffer 350 to preserve it.

The charge FIFO buffer 350 is a serial CCD structure that accepts input packets asynchronously and delivers output packets synchronously. The charge FIFO buffer 350 functions analogously to a digital FIFO memory, allowing the present invention to transform a fast, "bursty", low duty cycle sequence of charge packets into a slow, regular, high duty cycle sequence.

Since the output of the charge FIFO buffer 350 is synchronous, the pixels are read out even if there are no X-ray events present. The output of the FIFO buffer 350 is received and stored in a spectroscopic serial register 360 for preparation to be fed to the spectroscopic measurement chain 260 of FIG. 3.

At the end of the charge FIFO buffer 1070, the floating-diffusion charge-sensing amplifier 1080 carries out the final measurement of the charge packet before the charge is dumped at point 1090. In the preferred embodiment of the present invention, this measurement is carried out on the CCD chip. The floating-diffusion charge-sensing amplifier 1080 produces a voltage level with high precision based on the measured charge level of the charge packet.

The bookkeeping and memory chip 250 of FIG. 3 is a digital chip that keeps track of the neighborhoods of events and identifies the pixels stored in the event storage registers. The bookkeeping and memory chip 250 of FIG. 3 includes working storage for the bookkeeping process.

The support system further includes four clamp, deintegrate, integrate correlated double sampler circuits, one for each video output from 16 k by 16 k CCD imager 200. These four clamp, deintegrate, integrate correlated double sampler circuits share a single 12-bit charge division Analog to Digital Conversion (ADC) circuit.

Digital processing keeps track of the relationship between synchronization and discrimination signals from the focal plane and the ADC output; attaching pixel coordinates to pixel amplitudes and presenting a clean interface to an external system. If biases outside the range 0–3.3 V are required, the present invention can generate the biases with charge pumps or flyback circuits.

The power for a quadrant is estimated to be:

| | |
|---|---|
| Event Detector | 400 mW |
| Bookkeeper | 250 mW |
| Memory | 100 mW |
| On chip amplifiers | 10 mW |
| On chip logic | 10 mW |
| | 770 mW |

Thus, the grand total power for the four quadrants is about 2.3W. Moreover, despite the huge pixel rate, clocks are of reasonable speed. In this preferred embodiment, the fast clock is 32 MHz, but the bulk of the logic switches are clocked at ¼ this rate.

It is noted that a CMOS Active Pixel Sensor, comparable to the event-driven CCD embodiment illustrated in FIGS. 3 and 4, would require about 10 billion transistors. Such a CMOS Active Pixel Sensor would run hot, and therefore, have very poor performance. More specifically, a CMOS Active Pixel Sensor requires a few nano-Joules per pixel of dissipation in the array, so a Gpixel/sec CMOS Active Pixel Sensor would dissipate several watts of heat on the imager chip. Since silicon detector performance is severely degraded by elevated temperature, this would be a serious problem. In contrast, the Gpixel/sec event-driven CCD of the present invention runs cool as only about 80 mW of its heat dissipation is on the imager chip itself.

In Table 1 below, the relevant specifications and operating characteristics of a conventional CMOS Active Pixel Sensors is compared with those of the event-driven CCD array according to the concepts of the present invention. It is noted that for every performance characteristic except for raw frame and pixel rate, the event-driven CCD array according to the concepts of the present invention is markedly superior, and the event-driven CCD array requires no more power than the conventional CMOS Active Pixel Sensor device.

TABLE 1

| PERFORMANCE CHARACTERISITICS | Conventional CMOS Active Pixel Sensor | | Event-Driven X-Ray CCD Array |
|---|---|---|---|
| | PB-0720 | PB-1024 | |
| Optical Fill Factor | 23% | 60% | >90% |
| Differential Nonlinearity | 0.10% | Not Available | <0.01% |
| Integral Nonlinearity | 0.30% | Not Available | <0.01% |
| Pixel Rate (Mpix/sec) | 55 | 66 | 26 |
| Frame Rate (Frame/sec) | 60 | 500 | 100 |
| Approximate Depletion Depth (microns) | 0.4 | 0.4 | 40 |
| X-ray Photopeak QE (Calculated @ 4 keV) | ~4% | ~4% | 93% |
| Readout Noise (e-) | 100 | 50 | 1 to 3 |
| Power Comsumption (mW) | <250 | <100 | <100 |

While the CCD segment of the present invention may be any conventional frame transfer CCD, the preferred embodiment of the present invention contemplates using the frame transfer CCD, CCID-20, developed by The Massachusetts Institute of Technology's Lincoln Laboratory.

Figure 5:
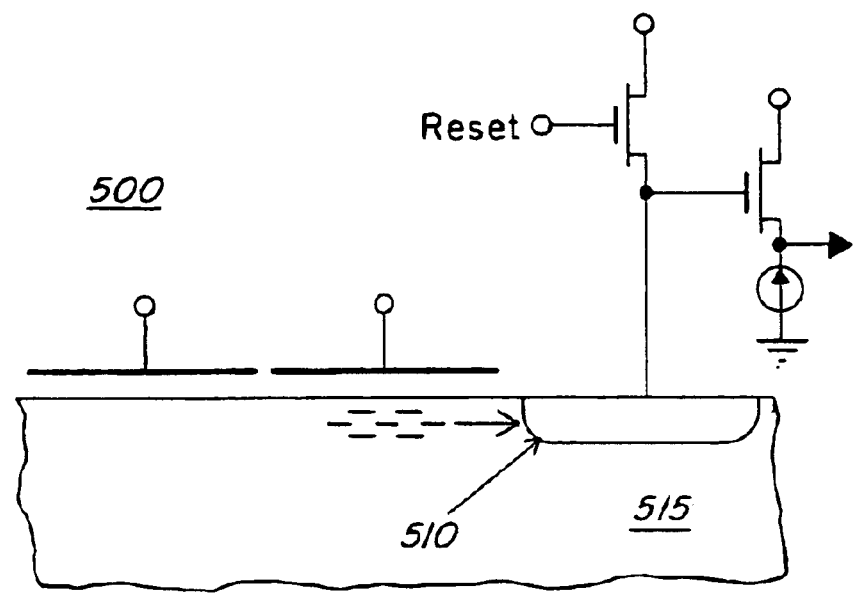
FIG. 5 is a graphical illustration of a floating-diffusion amplifier utilized with respect to the various embodiments of the present invention.

FIG. 5 illustrates an example of a floating-diffusion amplifier 500 utilized by the present invention. The charge is collected at charge-collection diode 510 in substrate 515 where it is destructively sensed or measured. In this floating-diffusion amplifier 500, kTC noise is introduced by the reset. Moreover, the floating-diffusion amplifier 500 realizes a readout noise of ~1 electron rms at 100 kHz, thereby providing a low noise, high performance floating-diffusion amplifier. In the preferred embodiment of the present invention, the floating-diffusion amplifier is identical to the output stage used in the above noted CCID-20.

Figure 6:
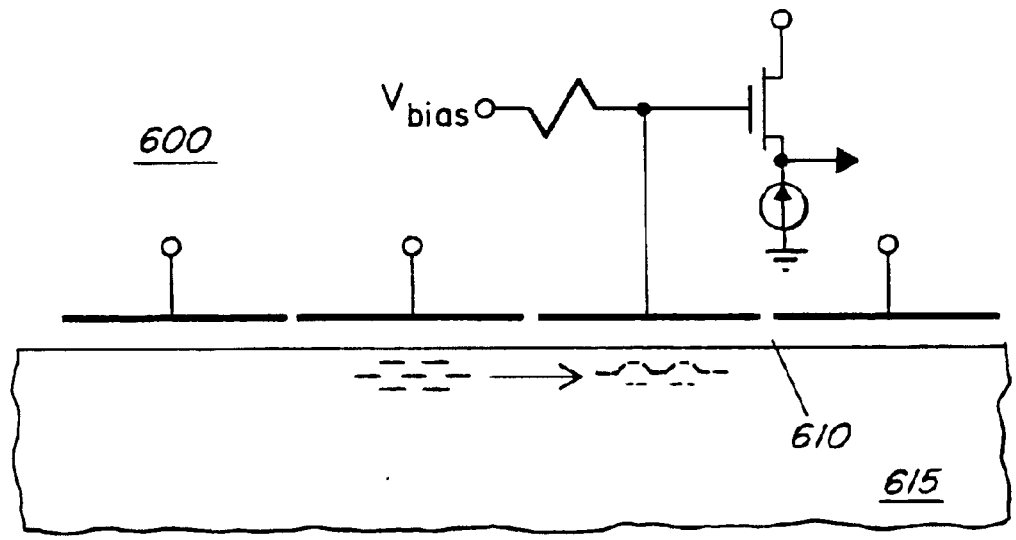
FIG. 6 is a graphical illustration of a floating-gate amplifier utilized with respect to the various embodiments of the present invention.

FIG. 6 illustrates an example of a floating-gate amplifier 600 utilized by the present invention and which is necessary for the non-destructive readout of the discrimination charge. As illustrated in FIG. 6, the charge is capacitively sensed at point 610 of the substrate 615. This floating-gate amplifier 600 has no kTC noise. The charge can be repeatedly transferred and sampled without destruction. Lastly, the floating-gate amplifier 600 realizes a readout noise of ~7 electron rms at 100 kHz.

As noted above, conventional X-ray sensors suffer from low pixel rates, which cause pileup in high throughout imaging spectrometers. The fundamental assumption underlying imaging spectroscopy with the photon-counting X-ray CCD is that each detected event is produced by exactly one X-ray photon. If this assumption is violated, the spectrum inferred from the detector will be in error. The condition that a given event is produced by more than one incident photon is called pileup.

Pileup occurs whenever there is a substantial probability that two or more photons interact sufficiently close together in the detector, within a single frametime, so that the resulting event appears to be the result of a single photon (or of a charged particle). The probability of pileup thus varies in proportion to the source flux and to the frametime. For any given imaging system, the pileup probability also increases with the effective area and the sharpness of the point response function. By allowing substantial reductions in frametime, the event-driven X-ray CDD of the present invention allows much brighter sources to be observed without pileup.

In practice, pileup induces significant spectral distortions when the probability that a single photon will interact in one pixel exceeds 1%. For imaging systems, pileup probability is maximized in observations of point sources, and is worst at the center of the imaging point response function.

Defining the product of the system effective area and the maximum encircled energy fraction in a single pixel as the peak effective area $A_{eff,peak}=A_{system} \times E_{pixel}$, the peak source flux $\Phi_{max}$ that can be observed without pileup is:

$$\Phi_{max} = 10^{-2}/(A_{eff,peak})^*T_f$$

where $T_f$ is the frametime and $\Phi$max is expressed as a photon flux.

Clearly, pileup is of greatest concern for systems with large effective area and high-resolution point-response functions. The factor of ~100 reduction in frametime provided by the event-driven CCD of the present invention provides a factor of ~100 increase in source flux that can be observed without pileup. This increased dynamic range is especially important for studies of bright transients, such as gamma ray burst sources.

In conventional X-ray CCDs, each image pixel is filtered, amplified, and digitized. Photons are detected by examining the digital result. The filtering, amplification and digitization must be done with low noise (<3 e⁻ RMS), high linearity circuitry to achieve the fidelity required for Fano noise limited spectroscopy. The fidelity requirements drive the power budget.

In the present invention, the photon detection step does not require this fidelity because when utilizing the concepts of the present invention there is a large gap between the minimum detectable charge and the minimum charge a photon can deposit. For example, if the FGA readout noise is 15 e⁻ and the detection threshold is set at 60 e⁻ (220 eV), the rate of false detections is only 0.003% per pixel processed. This is an acceptable rate, since these can be recognized and rejected in later processing.

In the present invention, since the noise is only about half this much, false events due to discriminator noise are effectively non-existent. More specifically, in the present invention, the discrimination noise is 7 e⁻ RMS, which takes <0.1% of the energy of high fidelity digitization to 3 e⁻ RMS. Thus, the present invention can inexpensively eliminate >99.6% of all pixels from consideration, digitizing only the remaining 0.4%. This dramatically reduces the requirements upon the power budget.

It is noted that clock power is also a problem for conventional X-ray CCD systems even though it is a small part of the power budget, because the peak clock power (required during frame transfer) is very large (as much as several watts per CCD chip). One difficulty is that clock power surges cause power supplies to sag, which in turn causes systematic variations in the video bias level.

In the preferred embodiment of the present invention, the peak clock power is reduced as compared to conventional X-ray CCD systems by: 1) lowering the gate capacitance of the present invention as compared to conventional X-ray CCD systems because the pixels and gate overlaps of the present invention are smaller by as much as 7.5 times smaller; 2) utilizing fewer pixels in the present invention as compared to conventional X-ray CCD systems (512×512 v. 1024×1024) and thus as much as four times fewer pixels need to be clocked; and 3) using smaller clock swings in the present invention as compared to conventional X-ray CCD systems (3.3V v 10V).

Thus, the present invention can realize as much as a five thousand times reduction in energy required per frame. This reduction in energy required per frame realized by the present invention has two positive effects. First, the present invention can run at a frame rate over 300 times greater than that of conventional X-ray CCD systems while using less clock power. Secondly, since the frame transfer energy of the present invention is ~30 $\mu$J, peak power is not an issue because this energy is small compared to the energy capacity of a reasonable bypass capacitor, causing power supply sag to be negligible, so the video bias will be constant. In other words, from a system point of view, the event-driven X-ray CCD device of the present invention is a constant power device.

Most of the radiation damage to a CCD in earth orbit results from energetic protons displacing silicon-atoms in the substrate. The process creates interstitial atoms and vacancies, which can diffuse and form stable associations with impurities and other defects. This introduces electron traps in the buried channel of the CCD, degrading its transfer efficiency.

There are two distinct components of the space proton flux that can cause damage in the CCD. One of the components is very low energy protons associated with the radiation belts. This component is extremely harmful once it hits the CCD. Fortunately, though, the CCD can be easily shielded by a thin layer of material.

The other component is comprised of solar flare protons with energies of tens of MeV. The characteristic damage caused by this type of radiation is the P-V trap. The P-V trap results from a vacancy tied to a phosphorus atom (a dopant species used to form the buried channel), which has an energy level about 0.42 eV below the conduction band. The P-V trap has an assumed emission time of 0.08 ms at 0° C.

The structure most susceptible to radiation damage in the present invention is the serial register, with its associated charge delay line, which undergoes the largest number of transfers. For a serial clock frequency ($f_{sc}$) of ~7 MHz, the period of charge transfer is about 0.15 $\mu$s, more than 2 orders of magnitude smaller than the P-V trap emission time. Thus, once filled, a trap will remain filled for a very long time on the clock frequency time scale. This condition means that the effect of a P-V trap is relatively benign for ~10° C. This condition also holds for the fast parallel transfer from the image section to the frame store section, since this clock frequency can be made faster than 0.5 MHz.

On the other hand, the P-V trap emission time may be close to the clocking period of the frame section transfer to serial register (0.04 ms). This transfer could be noticeably affected by radiation damage. However, since this section in the preferred embodiment of the present invention is quite short (only 256 pixels), the present invention can tolerate more than an order of magnitude of CTI degradation from the typical pre-irradiation value of $5\times10^{-7}$.

In addition, it is known to introduce narrow troughs into the parallel transfer channels to significantly reduce CTI degradation under irradiation, and thus the present invention, in its preferred embodiment, utilizes narrow troughs in the parallel transfer channels to significantly reduce CTI degradation.

Moreover, it is known that a charge injection technique can also be very effective in reducing the radiation damage effects. Thus, the present invention, in the preferred embodiment thereof, includes an input diode in the event-driven X-ray CCD device so that the harmful effects of electron traps in the transfer channel can be suppressed.

Lastly, since the serial register of the event-driven X-ray CCD of the present invention is so small, it is very easy to shield the serial register to the level of 20 g cm⁻² with an additional mass of only ~100 mg.

In the preferred embodiment of the present invention, the CMOS X-ray CCD is fabricated in silicon on insulator (SOI). The SOI comprises a thin (~50 nm) layer of silicon separated from the support wafer by a buried $SiO_2$ layer, while the CCD is fabricated in the support or handle wafer. Such an approach offers lower parasitic capacitances and thus a higher speed-power product for the logic and allows integration of CMOS control and timing logic and even A/D converters onto a CCD sensor with minimal power dissipation. Furthermore, the logic is electrically decoupled from the substrate, allowing complete freedom in choosing the substrate material.

This fabrication process supports feature sizes down to about 0.25 $\mu$m, which are compatible with X-ray detectors. This compatibility enables the fabrication of CCDs with pixel sizes of 2 $\mu$m or less, as well as charge-detection circuits, which are more sensitive and exhibit higher bandwidth than conventional fabrication processes. In addition, the fabrication process allows the use of high-resistivity silicon substrates for deep depletion.

Moreover, in conventional fabrication processes, there is a risk of slip dislocation arising in the utilized high priority float-zone silicon. Such dislocations arise from thermal stresses during high temperature processing. However, since the fabrication process utilized in fabricating the preferred embodiment of the present invention uses rapid thermal annealing (RTA), no significant amount of slip or other adverse affects are realized.

The gate structure of the 2 $\mu$m pixel CCD, used in the preferred embodiment of the present invention, utilizes a four-phase clocking design scheme and is implemented in two layers of polysilicon. The four-phase design maximizes the depletion depth of the device, since 3 out of 4 clocks can be held high during the integration period.

The radiation hardness of the CCD, used by the present invention and fabricated as discussed above, is comparable to conventional CCDs. The CCD of the present invention uses gate and field-oxide dielectrics that are one-half to one-third the thickness of conventional CCDs. This reduced thickness in the gate and field-oxide dielectrics provides greater hardness to the ionizing radiation damage that causes gate threshold-voltage shifts.

With respect to displacement damage from protons and other heavy particles, the individual CCD channels of the present invention are very narrow, confining the charge packets to widths of less than 1 $\mu$m much like a very narrow trough or notch. Such tight confinement is highly favorable for minimizing charge-trapping effects.

Another factor enhancing the hardness of the event-driven CCD of the present invention is the present invention's ability to operate at faster frame rates. Thus, the present invention can be used at higher temperatures with minimal impact from dark current compared to the slower devices of conventional CCDs. This enables device operations at temperatures that are more favorable for minimizing the trapping effects of proton-induced defects.

The present invention can be utilized to enable high-energy astrophysics studies. For example, the present invention can use in conjunction with X-ray Interferometry to achieve $\mu$arcsecond resolution.

Furthermore, the present invention can be utilized with X-ray polarimetry. For example, the present invention can be used to measure the polarization of the incoming irradiation, which would enable the study of galactic X-ray transients and black hole candidates; pulsars and low mass X-ray binaries; relativistic jets in BL Lac objects; and polarization in disks and jets of active galactic nuclei.

Lastly, space surveillance from space satellites requires that a sensor examine a wide field filled with sparse star and satellite images. These images are mostly confined to a few neighboring pixels, as is also the case for an X-ray CCD sensor. Moreover, it is often required to find the centroid of the several neighboring pixels that contain satellite image data, and to observe data for a number of frames so that accurate satellite tracks can be developed.

The event-driven CCD of the present invention facilitates the elimination of the dark background from the sparse star and satellite data so that the power of the system can be greatly reduced, while low noise detection of the fringe pixels can be accomplished to assure accurate centroiding. The low noise and room temperature operation of such sensor is important for small satellite use.

In summary, the event driven CCD of the present invention enables dramatically reduced power requirements as compared to conventional devices, and the speed the event driven CCD of the present invention is greater as compared to conventional devices because the event driven CCD of the present invention only digitizes pixels with useful photon information in them. In other words, the event driven CCD of the present invention detects only those pixels with charge exceeding a programmable level or threshold, while digitizing a 3×3 or 5×5 pixel subarray centered on the detected pixel.

Moreover, the event-driven CCD of the present invention: 1) utilizes high pixel rates to reduce pileup in high throughout imaging spectrometers; 2) reduces detector cost to enable affordability of large focal planes; 3) operates at near room temperature to reduce thermal system cost and lower risk ground testing; 4) reduces power requirements so as to lower satellite costs and reduce viewing angle constraints; and 5) utilizes small pixels to facilitate shorter focal length optics and enhance polarization sensitivity.

While various examples and embodiments of the present invention have been shown and described, it will be appreciated by those skilled in the art that the spirit and scope of the present invention are not limited to the specific description and drawings herein, but extend to various modifications and changes all as set forth in the following claims.

What is claimed is:

1. An imaging apparatus, comprising:
   a CCD imager having a plurality of pixels, each pixel producing a charge packet having a charge level in proportional to a level of radiation incident thereupon;
   a charge detection circuit, operatively connected to said CCD imager, to detect when a charge packet associated with a pixel has a charge level that exceeds a predetermined threshold; and
   a conversion circuit to convert charge packets into voltage levels, the converted charge packets being associated with a subarray of pixels centered upon a pixel having a charge packet with a charge level that said charge detection circuit has detected as exceeding said predetermined threshold.

2. The imaging apparatus as claimed in claim 1, wherein said charge detection circuit comprises:
   a floating-gate charge-sensing amplifier; and
   a clamp/sample correlated double sampling circuit, operatively connected to said floating-gate charge-sensing amplifier, to identify each pixel having a charge packet exceeding said predetermined threshold.

3. The imaging apparatus as claimed in claim 2, wherein said floating-gate charge-sensing amplifier senses the charge packet capacitively.

4. The imaging apparatus as claimed in claim 1, wherein said charge detection circuit noiselessly recovers the charge packet of the pixel for further processing.

5. The imaging apparatus as claimed in claim 1, wherein said predetermined threshold is programmable.

6. The imaging apparatus as claimed in claim 1, wherein said subarray of pixels is a 3×3 subarray centered on the detected pixel.

7. The imaging apparatus as claimed in claim 1, wherein said subarray of pixels is a 5×5 subarray centered on the detected pixel.

8. The imaging apparatus as claimed in claim 1, wherein the dimensions of said subarray of pixels are programmable.

9. The imaging apparatus as claimed in claim 1, wherein said CCD imager is an X-ray CCD imager.

10. The imaging apparatus as claimed in claim 1, wherein the dimensions of said pixels of said CCD imager are 2 $\mu$m×2 $\mu$m.

11. The imaging apparatus as claimed in claim 1, wherein the dimensions of said pixels of said CCD imager are 1.5 $\mu$m×1.5 $\mu$m.

12. An imaging apparatus, comprising:
   a CCD imager having a plurality of pixels, each pixel producing a charge packet having a charge level in proportional to a level of radiation incident thereupon;
   a charge detection circuit, operatively connected to said CCD imager, to detect when a charge packet associated with a pixel has a charge level that exceeds a predetermined threshold;
   a conversion circuit to convert charge packets into voltage levels, the converted charge packets being associated with a subarray of pixels centered upon a pixel having a charge packet with a charge level that said charge detection circuit has detected as exceeding said predetermined threshold;

a charge measuring circuit to measure the charge in the charge packet that said charge detection circuit has detected as exceeding said predetermined threshold and in charge packets associated with neighboring pixels;

a shape determination circuit to determine a shape of the charged particle event based on the charge measured by said charge measuring circuit; and a characterization circuit to characterize charge packets associated with a charged particle event as either rejected charge packets or a non-rejected charge packets based upon charged particle event's determined shape;

said conversion circuit converting non-rejected charge packets into voltage levels.

13. An imaging apparatus, comprising:

a CCD imager having a plurality of pixels, each pixel producing a charge packet having a charge level in proportional to a level of radiation incident thereupon;

a charge detection circuit, operatively connected to said CCD imager, to detect when a charge packet associated with a pixel has a charge level that exceeds a predetermined threshold;

a conversion circuit to convert charge packets into voltage levels, the converted charge packets being associated with a subarray of pixels centered upon a pixel having a charge packet with a charge level that said charge detection circuit has detected as exceeding said predetermined threshold;

a charge measuring circuit to measure the charge in the charge packet that said charge detection circuit has detected as exceeding said predetermined threshold and in charge packets associated with neighboring pixels;

a shape determination circuit to determine a shape of the charged particle event based on the charge measured by said charge measuring circuit;

a characterization circuit to characterize charge packets associated with a charged particle event as either rejected charge packets or a non-rejected charge packets based upon charged particle event's determined shape;

a frame storage area to store charge packets from said CCD imager;

a serial register to store the charge packets transferred thereto row by row from said frame storage area;

a charge delay circuit to store charge packets read out from said serial register; and a buffer to store charge packets that said characterization circuit has characterized as non-rejected charge packets;

said buffer synchronously feeding the stored charge packets to said conversion circuit;

said conversion circuit converting the non-rejected charge packets from said buffer into voltage levels.

14. The imaging apparatus as claimed in claim 13, wherein said conversion circuit is a floating-diffusion charge-sensing amplifier.

15. The imaging apparatus as claimed in claim 14, further comprising:

a clamp/deintegrate/integrate correlated double sampler, operatively connected to said conversion circuit; and a high linearity analog to digital conversion circuit.

16. A method of imaging, comprising:

(a) producing a charge packet having a charge level in proportional to a level of radiation incident upon a pixel of a CCD imager having a plurality of pixels;

(b) detecting when a charge level of a charge packet associated with a pixel exceeds a predetermined threshold; and (c) converting charge packets into voltage levels, the converted charge packets being associated with a subarray of pixels centered upon a pixel having a charge packet with a charge level that has been detected as exceeding the predetermined threshold.

17. The method as claimed in claim 16, wherein said detection noiselessly recovers the charge packet of the pixel for further processing.

18. The method as claimed in claim 16, further comprising:

(d) measuring the charge levels in the charge packets of the pixel that has been detected as exceeding the predetermined threshold and the pixels neighboring therewith, the charge packets of the pixel that has been detected as exceeding the predetermined threshold and the pixels neighboring therewith representing a charged particle event;

(e) determining a shape of a charged particle event based on the measured charge levels in the charge packets of the pixel that has been detected as exceeding the predetermined threshold and the pixels neighboring therewith, and (f) characterizing charge packets associated with a charged particle event as either rejected charge packets or a non-rejected charge packets based upon charged particle event's determined shape such that only the non-rejected charge packets are converted into voltage levels.

19. The method as claimed in claim 16, further comprising:

(d) measuring the charge levels in the charge packets of the pixel that has been detected as exceeding the predetermined threshold and the pixels neighboring therewith, the charge packets of the pixel that has been detected as exceeding the predetermined threshold and the pixels neighboring therewith representing a charged particle event;

(e) determining a shape of a charged particle event based on the measured charge levels in the charge packets of the pixel that has been detected as exceeding the predetermined threshold and the pixels neighboring therewith, and (f) characterizing charge packets associated with a charged particle event as either rejected charge packets or a non-rejected charge packets based upon charged particle event's determined shape;

(g) storing, in a frame buffer, charge packets from the CCD imager;

(h) storing, in a serial register, the charge packets transferred thereto row by row from the frame buffer;

(i) storing, in a delay buffer, charge packets read out from the serial register;

(j) storing, in a buffer, charge packets that have been characterized as non-rejected charge packets such that only the non-rejected charge packets stored in the buffer are converted into voltage levels.

20. The method as claimed in claim 19, further comprising:

(k) highly linearly converting the voltages levels to a digital value.

21. The method as claimed in claim 16, wherein the predetermined threshold is programmable.

22. The method as claimed in claim 16, wherein the subarray of pixels is a 3×3 subarray of pixels centered on the pixel having a charge packet with a charge level detected as exceeding the predetermined threshold.

23. The method as claimed in claim 16, wherein the subarray of pixels is a 5×5 subarray of pixels centered on the pixel having a charge packet with a charge level detected as exceeding the predetermined threshold.

24. The method as claimed in claim 16, wherein the dimensions of the subarray of pixels are programmable.

25. A method of finding of a centroid of several neighboring pixels that contain satellite image data using event driven imaging, comprising:

(a) producing a set of pixels of satellite image data, each pixel having a charge packet, the charge packet having a charge level in proportional to a level of radiation incident upon a pixel of a CCD imager;

(b) detecting when the charge level of a charge packet associated with a pixel exceeds a predetermined threshold;

(c) forming subarrays of pixels, each subarray of pixels being centered upon the pixel having a charge packet with a charge level exceeding the predetermined threshold;

(d) eliminating, from the produced set of pixels, pixels not associated with a formed subarray; and (e) determining a centroid for each subarray of pixels.

26. The method as claimed in claim 25, wherein the dimensions of the subarray of pixels are set so as to enable detection of fringe pixels.

27. The method as claimed in claim 26, wherein each subarray of pixels is a 3×3 subarray of pixels centered on the pixel having a charge packet with a charge level detected as exceeding the predetermined threshold.

28. The method as claimed in claim 26, wherein each subarray of pixels is a 5×5 subarray of pixels centered on the pixel having a charge packet with a charge level detected as exceeding the predetermined threshold.

29. The method as claimed in claim 26, wherein the dimensions of each subarray of pixels are programmable.

30. The method as claimed in claim 25, wherein the predetermined threshold is programmable.

* * * * *